United States Patent
Kacetl et al.

(10) Patent No.: US 12,438,389 B2
(45) Date of Patent: Oct. 7, 2025

(54) METHOD FOR CONTROLLING A REACTIVE POWER FLOW IN A HYBRID ENERGY STORAGE SYSTEM

(71) Applicant: Rimac Technology LLC, Sveta Nedelja (HR)

(72) Inventors: Tomáš Kacetl, Pardubice (CZ); Jan Kacetl, Pardubice (CZ); Wasim Sarwar Dilov, Zagreb (HR)

(73) Assignee: RIMAC TECHNOLOGY LLC, Sveta Nedelja (HR)

( * ) Notice: Subject to any disclaimer, the term of this patent is extended or adjusted under 35 U.S.C. 154(b) by 0 days.

(21) Appl. No.: 18/908,760

(22) Filed: Oct. 7, 2024

(65) Prior Publication Data

US 2025/0118986 A1    Apr. 10, 2025

(30) Foreign Application Priority Data

Oct. 10, 2023    (EP) .................................... 23202720

(51) Int. Cl.
*H02J 7/34* (2006.01)
*H02J 3/18* (2006.01)
(Continued)

(52) U.S. Cl.
CPC ................ *H02J 7/342* (2020.01); *H02J 3/18* (2013.01); *H02J 3/322* (2020.01); *H02J 7/0024* (2013.01);
(Continued)

(58) Field of Classification Search
CPC ...... H02J 7/342; H02J 3/322; H02J 7/007182; H02J 7/00714; H02J 3/18; H02J 7/0024;
(Continued)

(56) References Cited

U.S. PATENT DOCUMENTS

| 8,183,837 B2 | 5/2012 | Iida |
| 2003/0107352 A1* | 6/2003 | Downer .................. B60L 58/20 322/40 |

FOREIGN PATENT DOCUMENTS

| EP | 3028336 | 3/2018 |
| WO | 2014033522 | 3/2014 |

OTHER PUBLICATIONS

EPO, Extended European Search Report for EP Application No. 23202720.1, May 24, 2024.

* cited by examiner

*Primary Examiner* — Carlos Amaya
(74) *Attorney, Agent, or Firm* — Hodgson Russ LLP

(57) ABSTRACT

A method for actively controlling an output voltage of a first energy storage system connected to a second energy storage system The method can comprise providing at least one power flow demand value of at least one phase load and/or a phase grid; providing an output voltage measurement value and a current measurement value of the second energy storage system; calculating a power-flow-demand current value of the second energy storage system based on the at least one power flow demand value and the output voltage measurement value; calculating a control output voltage value of the first energy storage system based on the power-flow-demand current value and the current measurement value of the second energy storage system; modulating the control output voltage value into at least one control signal; and controlling the output voltage of the first energy storage system based on the at least one control signal.

19 Claims, 6 Drawing Sheets

(51) Int. Cl.
*H02J 3/32* (2006.01)
*H02J 7/00* (2006.01)

(52) U.S. Cl.
CPC .... *H02J 7/00714* (2020.01); *H02J 7/007182* (2020.01); *H02J 7/345* (2013.01); *H02J 2203/10* (2020.01); *H02J 2207/20* (2020.01); *H02J 2207/50* (2020.01)

(58) Field of Classification Search
CPC .... H02J 7/345; H02J 2207/20; H02J 2207/50; H02J 2203/10
See application file for complete search history.

METHOD FOR CONTROLLING A REACTIVE POWER FLOW IN A HYBRID ENERGY STORAGE SYSTEM

CROSS-REFERENCE

This application claims priority to European Patent Application No. 23202720.1, filed Oct. 10, 2023, the entire disclosure of which is incorporated herein by reference.

FIELD

The present application relates to a method for actively controlling an output voltage of a first energy storage system connected in parallel to a second energy storage system for controlling a reactive or active power flow from or into either of the energy storage systems. Furthermore, the present application relates to a power train and/or grid system.

BACKGROUND

In the realm of energy systems and electric power applications, several intriguing challenges arise when it comes to optimizing lifetime, performance and efficiency. In this context, three notable areas of concern are recuperative braking, field weakening of a traction motor, and providing reactive power in grid applications through periodically occurring micro-cycles. However, it is crucial to be aware of the potential drawbacks associated with these processes.

The concept of recuperative braking involves harnessing and converting kinetic energy into electrical energy during the deceleration or braking of a vehicle. While this can be a valuable method for energy recovery, it introduces additional cycling to the battery, which ultimately reduces its overall lifespan.

In conventional electric vehicles, electric motors with permanent magnets are applied. Such electric motors may require field weakening technique to increase an achievable speed of the electric motor. However, such a field weakening process requires reactive power, which micro-cycles a traction battery increasing heat generation and reducing the traction battery's lifetime.

In the context of grid applications, the periodic micro-cycles play a role in providing reactive power. However, this introduces additional stress on the battery, contributing to a decrease in its overall lifespan.

Hybrid battery packs often employ bidirectional DC-DC converters that are used to control a DC link voltage to improve efficiency of the inverter. While these converters provide a standard solution, they typically lack the required dynamics to effectively control the power flow of high frequency components (the ripple) and to mitigate the micro cycles. Thus, active control of the ripple and the mitigation of micro cycles remains unattended. As a result, alternative power conversion methods are frequently employed, leading to a decrease in overall system efficiency.

In this context, the term "ripple" refers to the unwanted fluctuation or oscillation in the output voltage or current of an electrical system as well as to a reactive power flow from or into an energy storage system. The unwanted fluctuation or oscillation in the output voltage and/or current of an electrical system represents a residual AC component that remains after the conversion of a DC voltage level to another, a DC voltage to an AC voltage, an AC voltage to a DC voltage or an AC voltage to another AC voltage. Ripple can occur in various electrical systems, such as power supplies, DC-DC converters, and inverters. It may be caused by the imperfect filtering or smoothing of the input or output signals, resulting in residual AC components superimposed on the desired DC signal. Such a ripple is usually characterized by its frequency and amplitude. In power supply applications, for example, the input voltage is often rectified to obtain a DC voltage, but due to imperfect filtering, some residual AC voltage, known as ripple voltage, remains. Similarly, in DC-DC converters, when converting from one voltage level to another, ripple current or voltage may appear in the output due to the switching action of the converter. The presence of ripple can have adverse effects on electronic systems, such as an energy storage system. Thereby, ripple may cause a fluctuation of the system's output energy and/or may cause micro-cycling in a systems energy storage.

SUMMARY

Against this background, it is an object of the present invention to provide an improved method for actively controlling power flow, specifically reactive power flow, of a hybrid energy storage system comprising a first energy storage system connected in parallel to a second energy storage system. Also, it is an object of the present application to provide an improved power train and/or grid system.

The object is attained by a method for actively controlling an output voltage of a first energy storage system connected in parallel to a second energy storage system for controlling a reactive or active power flow from or into either of the energy storage systems, the method having the features of claim 1. Furthermore, the object is attained by a power train and/or grid system having the features of claim 8.

Advantageous embodiments of the present disclosure are the subject matter of the dependent claims. Any and all combinations of at least two features disclosed in the description, the claims, and/or the figures fall within the scope of the present disclosure. Naturally, the explanations given in connection with the method equivalently relate to the power train and/or grid system according to the present disclosure without being mentioned redundantly in its/their context. In particular, linguistically common rephrasing and/or an analogous replacement of respective terms within the scope of common linguistic practice, in particular the use of synonyms backed by the generally recognized linguistic literature, are, of course, comprised by the content of the disclosure at hand without every variation having to be expressly mentioned.

In accordance with a first aspect, a method for actively controlling an output voltage of a first energy storage system connected in parallel to a second energy storage system for controlling a reactive or active power flow from or into either of the energy storage systems. The method comprises the steps of providing at least one reactive or active power flow demand value of at least one phase load and/or a phase grid; providing an output voltage measurement value and a current measurement value of the second energy storage system; calculating a reactive or active-power-flow-demand current value of the second energy storage system based on the at least one reactive or active power flow demand value and the output voltage measurement value; calculating a control output voltage value of the first energy storage system based on the reactive or active-power-flow-demand current value and the current measurement value of the second energy storage system; modulating the control output voltage value into at least one control signal; and controlling the output voltage of the first energy storage system based on the at least one control signal. Preferably, the control output voltage value is modulated into at least one control signal.

This control signal may be used to control and/or adjust the output voltage of the first energy storage system, thereby preferably ensuring that it aligns with the desired power flow demands.

The formulation "at least one phase load and/or a phase grid" may be replaceable throughout the description as well as the claims by the term "phase system", wherein the "phase system" preferably comprises at least one phase load or at least one phase grid or at least one phase load and at least one phase grid. Thus, following this wording, the method comprises the steps of providing at least one reactive or active power flow demand value of at least one phase system; providing an output voltage measurement value and a current measurement value of the second energy storage system; calculating a reactive or active-power-flow-demand current value of the second energy storage system based on the at least one reactive or active power flow demand value and the output voltage measurement value; calculating a control output voltage value of the first energy storage system based on the reactive or active-power-flow-demand current value and the current measurement value of the second energy storage system; modulating the control output voltage value into at least one control signal; and controlling the output voltage of the first energy storage system based on the at least one control signal.

"Output voltage" preferably refers to the electrical voltage that is produced or delivered by a device or system, such as the first energy storage system, as its final or resultant electrical signal. It preferably represents a voltage level and/or magnitude of the electrical signal that is generated at the output of the device or system, such as the first energy storage system.

"Connected in parallel" preferably refers to a configuration in which two or more electrical or electronic devices or systems are interconnected in such a way that they share a common electrical connection. In this configuration, the devices or systems preferably are connected side by side, allowing the flow of current to divide and distribute among them. When two energy storage systems are connected in parallel, it means that their positive terminals are connected to each other, and their negative terminals are connected to each other as well. This parallel connection preferably enables them to operate together as a single combined system, preferably with the ability to share the load and/or exchange power between them.

A "power flow demand value" preferably refers to values that represent the desired power flow from or into the respective first and/or second energy storage system and are determined based on the requirements of the phase load or the phase grid. Active power flow, also known as real power flow, preferably represents the actual transfer of power that performs useful work or produces energy within an electrical system. It is preferably measured in units of watts (W) and represents the rate at which energy is transferred from a power source to a load. Reactive power flow preferably represents the exchange of reactive energy between a source and a load in an electrical system. Unlike active power flow, reactive power preferably does not perform useful work but is necessary for maintaining voltage levels and/or supporting the operation of reactive components like inductors and/or capacitors. Reactive power flow is preferably measured in units of volt-amperes reactive (VAR).

The "output voltage measurement value" and "current measurement value" of the second energy storage system are provided/obtained. This preferably means that these measurements provide information about the current operating conditions of the second energy storage system.

According to the presented method, there may be provided a way to at least partly mitigate reactive power in an energy storage system, such as a hybrid battery system. The energy storage system may comprise a hard-wired battery and/or paralleled reconfigurable battery or a plurality of energy storage units, each of which may comprise a plurality of battery cells. The load conditions may be actively controlled by the first and/or the second energy storage system, for example, to provide continuous load conditions on either of the first or the second energy storage system. Furthermore, the lifetime of at least one of the energy storage unit and/or energy storage system may be increased. Thereby, an appropriate control of the power flow requires relatively high-power electronics and significantly higher dynamics compared to the use of an inverter. These requirements can be achieved by the first energy storage system, which preferably uses low voltage switches with high dynamics and/or with low switching losses. This allows for a significant increase in switching frequency.

The presented method may be used for mitigating a reactive power flow into either of the first or the second energy storage system, particularly to decrease stress on the respective energy storage system and/or to increase the lifetime of the respective energy storage system. The first energy storage system may be constructed as a reconfigurable, preferably modular, energy storage system. The phase grid and/or phase load may comprise at least one phase, preferably at least two phases, more preferably at least three phases. Of course, the phase grid may also comprise more than three phases without departing from the presented scope. The phase grid may be understood as a grid of any kind or an N-phase grid.

In an embodiment, providing the at least one reactive or active power flow demand value comprises at least one of the following steps: calculating the at least one reactive or active power flow demand value based on a phase voltage measurement value and a phase current measurement value using a power-calculation-algorithm; and/or calculating the at least one reactive or active power flow demand value based on two d-q-transform values of, preferably phase-individual, phase voltage measurement values and two d-q-transform values of, preferably phase-individual, phase current measurement values of the at least one phase load and/or the phase grid; and/or calculating and/or receiving the at least one reactive or active power flow demand value based on an accelerator input value provided by an accelerator of a vehicle; and/or calculating and/or receiving the at least one reactive or active power flow demand value of the phase grid based on an active power flow demand and/or a reactive power flow demand of the phase grid; and/or measuring the at least one reactive or active power flow demand value on the phase grid and/or the at least one phase load.

The d-q transform is a mathematical transformation technique used to convert three-phase electrical quantities into a rotating reference frame. The d-q transform preferably simplifies the analysis and control of three-phase systems by transforming them into a two-dimensional coordinate system. This is achieved by aligning a reference frame with the rotating magnetic field of an AC machine, such as an induction motor or a permanent magnet synchronous motor. The d-q transform preferably consists of two orthogonal transformations, namely, the d transform and the q transform. The d transform preferably produces the direct-axis component of the two-dimensional representation. It aligns with the magnetic field vector of the AC machine, which is typically associated with the torque-producing component of the system. The q transform complements the d transform by generating the quadrature-axis component. It is orthogonal to the direct-axis component and represents the magnetizing or flux-producing component of the system. Together, the d and q transforms convert the three-phase quantities into a two-dimensional representation in the rotating reference frame, often referred to as the d-q reference frame.

Of course, any kind of suitable power-calculation-algorithm may be used. As a further exemplary power-calculation-algorithm, an α-β transform algorithm may be used for calculating the at least one reactive or active power flow demand value. The α-β transform, also known as the Clarke transform, is a mathematical transformation technique preferably used to convert a preferably three-phase coordinate system into a two-phase coordinate system. The α-β transform may allow the representation of a set of three-phase quantities in a two-dimensional coordinate system. The α transform preferably converts the three-phase quantities into a two-phase system, where one phase represents the average value of the three-phase system. The α transform output is preferably referred to as the "direct-axis" or "in-phase" component. The β transform preferably complements the α transform by generating the second component of the two-phase system, which is orthogonal to the direct-axis component. It preferably represents the "quadrature-axis" or "90 degrees out-of-phase" component. Thus, calculating the at least one reactive or active power flow demand value may be performed based on two α-β transform values of, preferably phase-individual, phase voltage measurement values and two α-β transform values of, preferably phase-individual, phase current measurement values of the at least one phase load and/or the phase grid.

In a further embodiment, the at least one reactive or active power flow demand value may be calculated based on a provided apparent power demand value of the phase load and/or the phase grid. The apparent power depends on both the active power and the reactive power. Apparent power may be a measure of the total power flow in an electrical system, considering both the active power (real power) and the reactive power components. It is preferably denoted by the symbol "S" and is measured in units of volt-amperes (VA). Apparent power preferably represents the total magnitude of power in an AC circuit, considering the combination of active power (P) and reactive power (Q). It is preferably the vector sum of active power and reactive power, considering their magnitudes and phase relationships.

In a further embodiment, the calculating the at least one reactive or active power flow demand value based on the two d-q-transform values of the preferably phase-individual phase voltage measurement values and the two d-q-transform value of the preferably phase-individual phase current measurement values of the at least one phase load and/or the phase grid comprises: providing at least one position and/or phase signal of the at least one phase load and/or phase grid; providing the phase measurement voltage values of the at least one phase load and/or the phase grid, preferably by measuring the phase voltage measurement values with at least one voltage sensor; transforming the phase voltage measurement values into a d-q-system to provide the two d-q-transform values of the phase voltage measurement values of the at least one phase load and/or the phase grid; and providing the two d-q-transform value of the phase current measurement values of the at least one phase load and/or the phase grid by a control circuit of the at least one phase load and/or the phase grid. Of course, alternatively or additionally, the α-β transform algorithm may be used.

The voltage may be measured by any kind of suitable voltage sensor. A position signal may be provided for a rotational load, such as a motor. A phase signal may be provided for a power grid. For position measuring, a Hall-sensor may be used. For phase sensing, voltage transformers (VTs), current transformers (CTs), Hall-sensors, Digital Phase Meters, and/or Synchro/Resolver Sensors may be applied. The control circuit of the at least one phase load and/or the phase grid preferably refers to the system or circuitry responsible for monitoring and/or regulating the operation of electrical loads or the electrical grid in a specific phase/setting or setup. The control circuit may comprise at least one sensor for measuring various electrical parameters, such as voltage, current, power, frequency, or phase angle. The control circuit may comprise at least one controller for processing the sensor feedback signals and/or for comparing them to set points and/or thresholds and/or control parameters. The control circuit may comprise at least one actuator for receiving the control signals from the controller and for performing the necessary actions to regulate the operation of the load or the grid. Such actuators may encompass switches and/or power electronic devices that can control voltage, current, or power flow. The control circuit may incorporate specific algorithms or control strategies that determine how the system responds to different operating conditions. These strategies can involve various control techniques, such as proportional-integral-derivative (PID) control, adaptive control, feedback control, or advanced control algorithms. The control circuit may comprise protection and/or safety features, for example, to prevent damage to the load, the grid, or the control components.

In a further embodiment, the providing the two d-q-transform values of the phase current measurement values of the at least one phase load and/or the phase grid by the control circuit of the at least one phase load and/or phase grid comprises the following steps performed by the control circuit: providing the at least one position and/or phase signal of the at least one phase load and/or phase grid by measuring the at least one position and/or phase signal with a position sensor and/or a position identification algorithm; providing the phase current measurement values of the at least one phase load and/or the phase grid by measuring the phase current measurement values of the at least one phase load and/or the phase grid; and transforming the phase current measurement values into the d-q-system to provide the two d-q-transform values of the phase current measurement values of the at least one phase load and/or the phase grid.

For providing the at least one position and/or phase signal of the at least one phase load and/or phase grid, at least one position sensor, usually for a rotational load, such as an electric motor of a vehicle, may be used. Alternatively or additionally, a position identification algorithm may be applied. As such a position identification algorithm, a phase lock loop may be incorporated, preferably for grid applications. Such a phase lock loop preferably refers to an algorithm that calculates the phase signal from voltage measurement values, preferably from each phase of the N-phase power grid.

In a further embodiment, the providing the output voltage measurement value and the current measurement value of the second energy storage system comprises: monitoring the output voltage measurement value and the current measurement value of the second energy storage system by an energy storage management system of the second energy storage system. Preferably, the output voltage measurement value and/or the current measurement value of the second energy storage system is monitored at regular time intervals.

In a further embodiment, the controlling of the output voltage of the first energy storage system issues an actively controlling of the reactive or active power flow from or into the second energy storage system.

Accordingly, controlling and/or regulating the output voltage of the first energy storage system may be achieved by this embodiment. Therefore, mechanisms may be applied to adjust and/or manipulate the voltage level generated by the first energy storage system. Furthermore, according to the provided method, the capability is available to influence and/or manage the direction and/or magnitude of power flow between the first and second energy storage systems. Preferably, reactive power represents the exchange of reactive energy that supports the voltage stability and/or operation of reactive components. Active power preferably represents the power flow that performs useful work and/or transfers energy.

In a further embodiment, the providing at least one reactive or active power flow demand value comprises: providing a plurality of reactive or active power flow demand values of a plurality of phase loads and/or the phase grid, and summing the plurality of reactive or active power flow demand values of the plurality of phase loads and/or the phase grid. Thus, the method may also be applied when more than one phase load may be connected to the first and the second energy storage system.

In accordance with a second aspect, a power train and/or grid system is provided. The power train and/or grid system at least comprising: a second energy storage system; a first energy storage system connected in parallel to the second energy storage system; an inverter unit connected in parallel to the first energy storage system and the second energy storage system; and a battery controller used for actively controlling an output voltage of the first energy storage system for controlling a reactive or active power flow from or into either of the energy storage systems; the battery controller at least configured to perform the steps of providing at least one reactive or active power flow demand value of at least one phase load and/or a phase grid; providing an output voltage measurement value and a current measurement value of the second energy storage system; calculating a reactive or active-power-flow-demand current value of the second energy storage system based on the at least one reactive or active power flow demand value and the output voltage measurement value; calculating a control output voltage value of the first energy storage system based on the active-power-flow-demand current value and the current measurement value of the second energy storage system; modulating the control output voltage value into at least one control signal; and controlling the output voltage of the first energy storage system based on the at least one control signal.

Of course, all features and embodiments described for the method apply to the power train and/or grid system. Especially, all provided definitions and/or explanations of features or parts of features mutually apply to the hereby claimed system. The battery controller may be configured as a part of a battery management system (BMS) of the first and/or the second energy storage system. In alternative configurations, the battery controller may be a separate component.

In an embodiment, the first energy storage system is configured to receive the reactive power flow at least partly to mitigating said reactive power flow to the second energy storage system.

The first energy storage system may be preferably structured and/or set up to receive or provide reactive power flow. This may suggest that the first energy storage system has the capability to periodically absorb or provide reactive energy. The purpose of configuring the first energy storage system to receive reactive power flow is preferably to mitigate and/or reduce the amount of reactive power that would otherwise flow towards the second energy storage system. Mitigating in this context preferably means diminishing or lessening the magnitude of the reactive power flow. The second energy storage system may be generally seen as the target or recipient of the reactive power flow. By at least partly mitigating the reactive power flow towards the second energy storage system, it may imply that the first energy storage system acts as a buffer and/or stabilizer, absorbing and/or dampening the reactive power before it reaches the second system. Due to the use of the first energy storage system, negative effects that come along with reactive power flow may be omitted on the second energy storage system, thereby leading to an extended lifetime of the second energy storage system. Thus, the first energy storage system is configured to receive the reactive power flow, thereby protecting and/or optimizing the operation of the second energy storage system. The first energy storage system may also be configured in a way that providing the reactive power causes less harm in the first energy storage system. This configuration ensures that the second energy storage system is not overwhelmed by excessive reactive power and can operate more efficiently or reliably. Also, the lifetime and/or lifespan of the second energy storage system may be increased by this setup and/or configuration.

In a further embodiment, the method and/or the power train and/or grid system may further comprise: the at least one phase load, preferably at least one electric machine, and/or the phase grid connected to the inverter unit; a current measurement sensor for measuring phase current measurement values of the at least one phase load and/or the phase grid; an energy storage system voltage and energy storage system current sensor for measuring the output voltage measurement value and the current measurement value of the second energy storage system; at least one position sensor and/or a position identification algorithm for measuring at least one position and/or phase signal; and an inverter controller configured to control the inverter unit based on the phase current measurement values, the position and/or phase signal, the output voltage measurement value and the current measurement value of the second energy storage system.

In other words, the method and/or the power train and/or grid system comprises at least one phase load and/or the phase grid, all of which are connected to the inverter unit. This indicates that the inverter unit may be responsible for converting and/or controlling the electrical power supplied to the phase load or the phase grid. The inverter controller may utilize inputs from various sources, including the phase current measurement values, the position and/or phase signal, and the output voltage measurement value and current measurement value of the second energy storage system. It may process these inputs to determine the appropriate control signals for the inverter unit, thus, providing efficient and/or accurate control of the overall power train and/or grid system.

In a further embodiment, at least one capacitor connected in parallel to the first energy storage system is provided.

The capacitor being configured to receive the reactive power flow at least partly to mitigating said reactive power flow to the second energy storage system and/or the first energy storage system. Such capacitors may provide the ability to store and/or release electrical energy quickly, making it well-suited for reactive power compensation. By connecting a capacitor in parallel to the first and the second energy storage system, it can at least partly absorb and release reactive power, mitigating the reactive power flow towards the first and/or the second energy storage system. This helps to stabilize voltage levels and improve power factor. Also, such a capacitor may help maintain voltage stability within an electrical system. By connecting the capacitor in parallel, it may provide reactive power support, especially during periods of high demand and/or voltage drops within the overall system. This voltage support ensures the second energy storage system operates within acceptable voltage limits, enhancing system performance and reliability. Also, such a capacitor may help optimize power flow and/or improve overall system efficiency. By absorbing reactive power from the system, the at least one capacitor may reduce the burden on the energy storage systems, allowing them to operate more efficiently. This results in reduced losses, lower energy consumption, and improved utilization of the energy storage systems. Also, use of such capacitors may provide the effect of a fast response time, making its use effective in compensating reactive power fluctuations and/or maintaining system stability. The capacitor's ability to rapidly absorb and/or release energy helps to quickly respond to changes in reactive power flow, ensuring efficient power transfer and minimizing voltage variations. Also, generally, capacitors are relatively inexpensive compared to other power compensation solutions.

In a further embodiment, the method and/or the power train and/or grid system further comprises at least a first filter unit connected to the first energy storage system; and/or at least a second filter unit connected to the second energy storage system.

Filters are preferably designed to reduce and/or eliminate unwanted harmonics in electrical systems. The at least one first and/or second filter may preferably be configured for stabilizing the power flow of from or into the first and/or the second energy storage system. Furthermore, the at least one first and/or second filter may be configured for allowing a preferably stepless and/or smooth current control of the first and/or the second energy storage system. By connecting a filter unit to the first energy storage system and/or the second energy storage system, it can effectively mitigate harmonic distortion caused by nonlinear loads or other sources. This helps to maintain a cleaner and more stable power supply, reducing equipment malfunctions and improving overall system performance. Also, filter units may help regulate voltage levels within an electrical system. Filters can smooth out voltage fluctuations and/or transients, providing a more stable and consistent voltage supply to the energy storage systems. This may enhance the performance and/or reliability of the energy storage systems, ensuring they operate within their specified voltage range. In furtherance, filters may improve power quality by reducing voltage sags, surges, and transients. They may help to minimize voltage distortions, flickering, and/or other power anomalies that can negatively impact the performance of electrical equipment. This results in improved power factor, reduced power losses, and enhanced overall system efficiency. Particularly preferably, the at least one first and/or second filter may be an inductor.

In a further embodiment, the method and/or the power train and/or grid system further comprising: the phase grid at least temporarily connectable to the inverter unit for performing a charging operation of the first and/or the second energy storage system and/or for performing a grid support operation; a power controller configured to control the inverter unit based on an active power flow demand and a reactive power flow demand; and/or a power measurement sensor for measuring the at least one active power flow value on the phase grid; and/or the battery controller configured to control the output voltage of the first energy storage system based on the active power flow demand of the phase grid and/or based on a measured active power flow demand value of the grid.

The power controller may be a grid power controller. In alternative embodiments, the power controller may be a power train power controller and/or a phase load power controller.

In a further embodiment, the first energy storage system comprising at least one switching device; wherein the first energy storage system further comprising at least two energy sources, the switching device being configured to selectively switch the at least two energy sources with respect to one another at least temporarily in series positive or in series negative or in parallel to generate a controllable alternating or direct current at the output of the first energy storage system, or wherein the first energy storage system comprising a battery and a DC/DC-converter, the DC/DC-converter being configured to at least temporarily connect and/or disconnect, preferably an output of, the first energy storage system in parallel to the second energy storage system. In the case where the first energy storage system comprises the battery and the DC/DC-converter, the DC/DC-converter itself may be considered as the switching device.

"Switching device" preferably refers to electronic devices, such as transistors or thyristors, used within the first energy storage system to control the flow of electric current. These switching devices can be turned on or off selectively to enable or interrupt the current path and facilitate the desired energy transfer or conversion.

In a further embodiment, the second energy storage system comprises a preferably hardwired, battery. The battery may be a traction battery of a vehicle. The battery may be a buffer battery of power application. Alternatively or additionally, the second energy storage system may comprise energy storages like at least one fuel cell and/or at least one capacitor and/or at least one super capacitor and/or at least one ultra capacitor and/or at least one flywheel, preferably with at least one DC/DC-converter.

In a further embodiment, the second energy storage system comprises a single energy storage unit or a plurality of energy storage units. In other words, in one embodiment, the second energy storage system consists of a single energy storage unit. The single energy storage unit may comprise a plurality of energy storage cells. This may suggest that there is only one storage device or unit used for storing electrical energy. In another embodiment, the second energy storage system comprises multiple energy storage units. This may indicate that there are multiple individual energy storage devices connected to form the second energy storage system.

It shall be understood that the term "energy storage system" is not be understood as to be limited to energy storage, but also any kind of energy source may fall under said term. Also, it shall be understood that the term "energy storage unit" is not be understood as to be limited to energy storage, but also any kind of energy source may fall under said term.

In a further embodiment, each of the at least two energy sources comprises at least one battery cell and/or at least one capacitor and/or at least one photovoltaic panel and/or at least one fuel cell and/or at least one alternative source of electrical energy. Generally, other energy sources may be possibly implemented. Thus, the provided listing is not meant to be limiting.

In a further embodiment, the first energy storage system comprises a high-power density in comparison to the second energy storage system; and wherein the second energy storage system comprises a high-energy density in comparison to the first energy storage system. Due to the configuration of the first energy storage system as a high-power density system, harm caused by micro cycling may be minimized, thereby diminishing negative effects of micro cycles on the lifetime of the first energy storage system.

In this embodiment, the first energy storage system is characterized by a high-power density. This means that it can deliver or absorb electrical power at a relatively high rate compared to its size or weight. The focus is on the system's power-handling capability, enabling it to provide high-power output or accept high-power input. Conversely, the second energy storage system is described as having a high-energy density. This indicates that it has the capacity to store and/or hold a significant amount of electrical energy relative to its size or weight. The emphasis is on the system's energy storage capacity, allowing it to store a large amount of energy within a relatively small volume or mass. By incorporating these distinct power/energy characteristics into the energy storage systems, it becomes possible to tailor their functionalities to specific needs. For instance, the first system's high-power density may be suitable for applications requiring rapid power delivery or absorption, such as electric vehicle acceleration or regenerative braking. The second system's high-energy density, on the other hand, may be advantageous for long drive range applications. In other words, with the present invention, there can be provided an energy storage solution for electric vehicles, whereby the high-power density energy storage system may lead to an enhanced acceleration performance, whereas the high-energy density energy storage system may lead to an enhanced drive ranges of the electric vehicle. By combining the two energy storage systems, both beneficial effects can be achieved by a single energy storage package, at least including the first and the second energy storage system. Furthermore, along with the aforementioned advantages, with the present invention, there can be provided reactive power mitigation, which leads to an extension of the lifetime of at least one of the first and the second energy storage system.

In an alternative embodiment, the first energy storage system comprises a high-energy density in comparison to the second energy storage system; and wherein the second energy storage system comprises a high-power density in comparison to the first energy storage system. In this configuration, the second energy storage system has a high-power density system, and hence the harm caused by micro cycling may be minimized, thereby diminishing negative effects of micro cycles on the lifetime of the second energy storage system.

In this embodiment, the first energy storage system is characterized by a high-energy density. This preferably means that it has the capacity to store or hold a significant amount of electrical energy relative to its size or weight. The focus is on the system's energy storage capacity, allowing it to store a large amount of energy within a relatively small volume or mass. Conversely, the second energy storage system is described as having a high-power density. This preferably indicates that it has the ability to deliver and/or absorb electrical power at a relatively high rate compared to its size or weight. The emphasis is on the system's power-handling capability, enabling it to provide high-power output and/or accept high-power input. By incorporating these distinct characteristics into the energy storage systems, it may become possible to tailor their functionalities to specific needs. For example, the first system's high-energy density may be advantageous for applications requiring long-range energy storages for electric vehicles. The second system's high-power density, on the other hand, may be suitable for an acceleration and/or recuperation application provided in the electric vehicle requiring rapid power delivery and/or absorption.

In a further aspect, there is provided a data processing device, preferably a battery controller, comprising means for preferably at least partly carrying out the herein provided method according to any one of its embodiments.

In a further aspect, there is provided an electric vehicle comprising a data processing device comprising means for carrying out the herein provided method according to any one of its embodiments and/or at least one of the herein provided power train and/or grid system according to any one of its embodiments.

All aspects and embodiments as described above may be combined as deemed fit by the skilled person.

"A(n)" in the present case should not necessarily be understood to be restrictive to exactly one element. Rather, a plurality of elements, such as, for example, two, three or more, can also be provided. Any other numeral used here, too, should not be understood to the effect that there is a restriction to exactly the stated number of elements. Rather, numerical deviations upwards and downwards are possible, unless indicated to the contrary.

Further possible implementations of the invention also comprise not explicitly mentioned combinations of any features or embodiments that are described above or below regarding the exemplary embodiments. In this case, a person skilled in the art will also add individual aspects as improvements or supplementation to the respective basic form of the invention.

Unless indicated to the contrary, elements that are the same or functionally the same have been given the same reference signs in the figures. It should also be noted that the illustrations in the figures are not necessarily true to scale.

DETAILED DESCRIPTION

Figure 1:
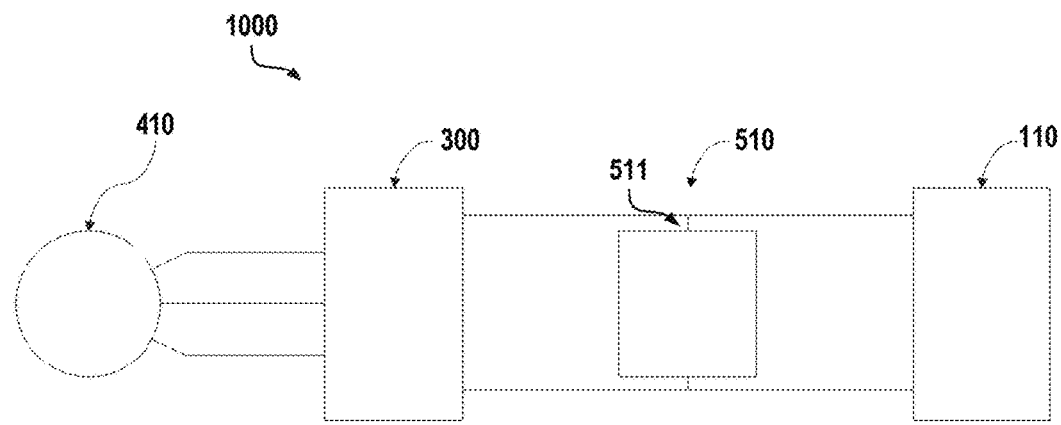
FIG. 1 shows an exemplary refinement of a presented power train and/or grid system.

FIG. 1 shows a refinement of a power train and/or grid system 1000. The power train and/or grid system 1000 comprises a first energy storage system 510 connected in parallel to a second energy storage system 110 for controlling a reactive or active power flow from or into either of the energy storage systems 510, 110. In the shown refinement, the first energy storage system 510 is configured as a reconfigurable battery. In the shown refinement, the second energy storage system 110 comprises a hard-wired battery. Only exemplarily, an inverter unit 300 is connected to the first and the second energy storage system 510, 110. At least one phase load and/or the phase grid 410 is connected to the inverter unit 300. Reference numeral 410, here, refers to both, at least one phase load and/or the phase grid. According to FIG. 1, the phase load and/or the phase grid 410 is configured as a three-phase load and/or the three-phase grid.

Preferably, the first and the second energy storage system 510, 110 together contribute to the DC (direct current) load of the at least one phase load 410. Thereby, the inverter unit 300 preferably converts the AC power of the phase load 410 to a DC power (DC load) handled by the first and/or the second energy storage system 510, 110, and vice versa. Furthermore, the first energy storage system 510 may be configured to actively control its output voltage 511, also named as terminal voltage. Thereby, the first energy storage system 510 is configured to control its contribution to the DC load, where the contribution of the second energy storage system 110 may be considered as a complement to the DC load, that is preferably indirectly controlled by the first energy storage system 510. Each energy storage system 110, 510 may comprise energy storage cells of different qualities, e.g., high power and/or high energy and/or fresh cells and/or second life cell. Also, the chemistry of each cell may be different, where each energy storage system 110, 510 may work under different load conditions. The load conditions may be actively controlled by the first energy storage system 510 to, for example, adapt the first energy storage system 510 to soak a ripple and to provide continuous load conditions on the second energy storage system 110. In other configurations of the system 1000, this may happen vice versa. Alternatively, the first energy storage system 510 may be configured such that the second energy storage system 110 soaks the ripple and provides preferably continuous load conditions on the first energy storage system 510. In the context of the application, the ripple has a reactive character, and therefore, the term reactive power is used as an alternative expression for the term ripple herein. In furtherance, alternatively, the first energy storage system 510 may be controlled in a way to cover reactive power, e.g., when entering a field-weakening region of phase load operation, such as a motor operation, or during recuperative breaking. This may be performed to minimize additional cycling of cells in the second energy storage system 110. In other configurations of the system 1000, this may happen vice versa.

The invention describes a way to mitigate reactive power in a hybrid battery system, which integrates a reconfigurable battery to improve load conditions in the battery system.

Figure 2:
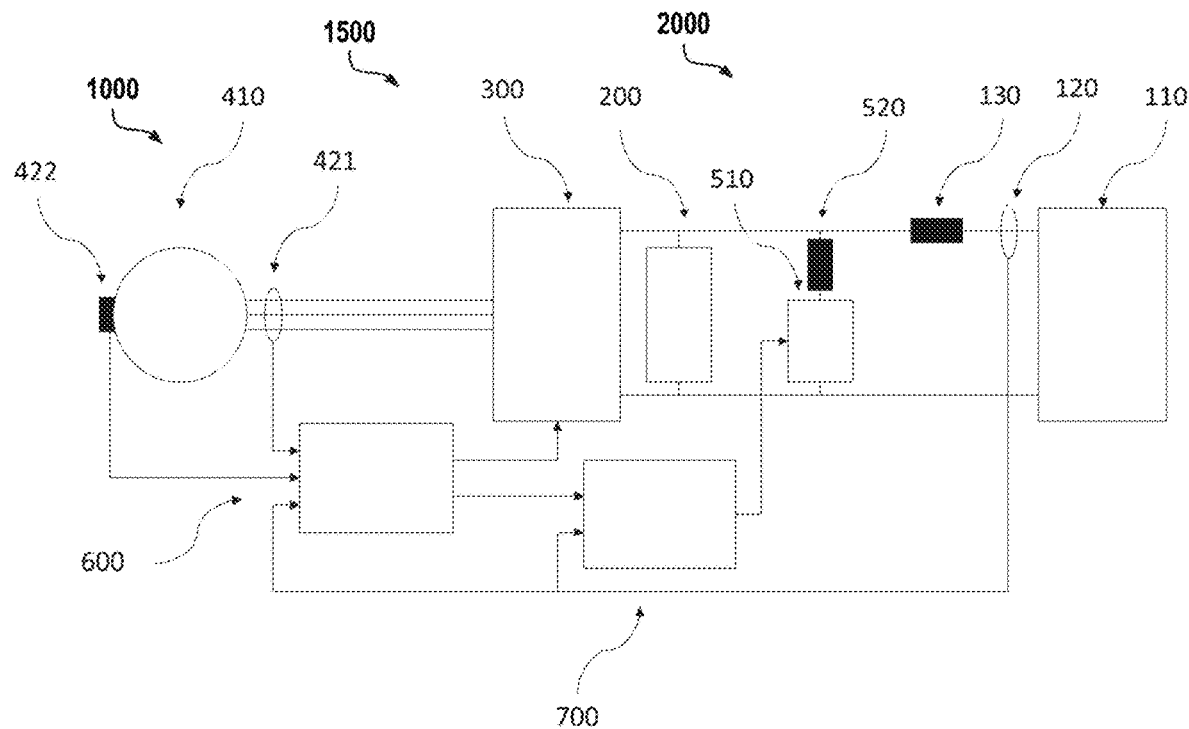
FIG. 2 shows an exemplary refinement of a presented power train and/or grid system.

According to FIG. 2, a further refinement of the power train and/or grid system 1000 is shown. In this embodiment, the three-phase load 410 may be represented by an electric motor that may be included in a powertrain 1500 of an electric vehicle 2000. The power train and/or grid system 1000 comprises the inverter unit 300 configured as a traction inverter 300. Besides the first and the second energy storage systems 510, 110 the power train and/or grid system 1000 further comprises a capacitor 200 configured as a DC link capacitor. In the shown refinement, both, the first and the second energy storage system 510, 110 are equipped with optional filter units 130 and 520 to improve functionality.

The power train and/or grid system 1000 comprises an inverter controller 600 configured to control the inverter unit 300. The inverter controller 600 may be more generally described as a control circuit of the at least one phase load and/or the phase grid 410. Therefore, the inverter controller 600 may be provided with means suitable for executing a control loop. The executing of the control loop may require sensing of phase current measurement values. These measurements may be performed by a current measurement sensor 421. The executing of the control loop may require sensing of and/or providing a position signal, if a phase load is applied to the system 1000, and/or a phase signal, if a phase grid is applied to the system 1000. A position measurement may be performed by a position sensor 422. In the alternative, the position signal may be provided by a position identification algorithm.

The power train and/or grid system 1000 comprises a battery controller 700 configured to control the output voltage 511 of the first energy storage system 510. Battery controller 700 may be configured to monitor and/or measure an output voltage measurement value and a current measurement value of the second energy storage system 110. To perform said measurements, the battery controller 700 and or the system 1000 may comprise an energy storage system voltage and energy storage system current sensor 120.

Figure 3:
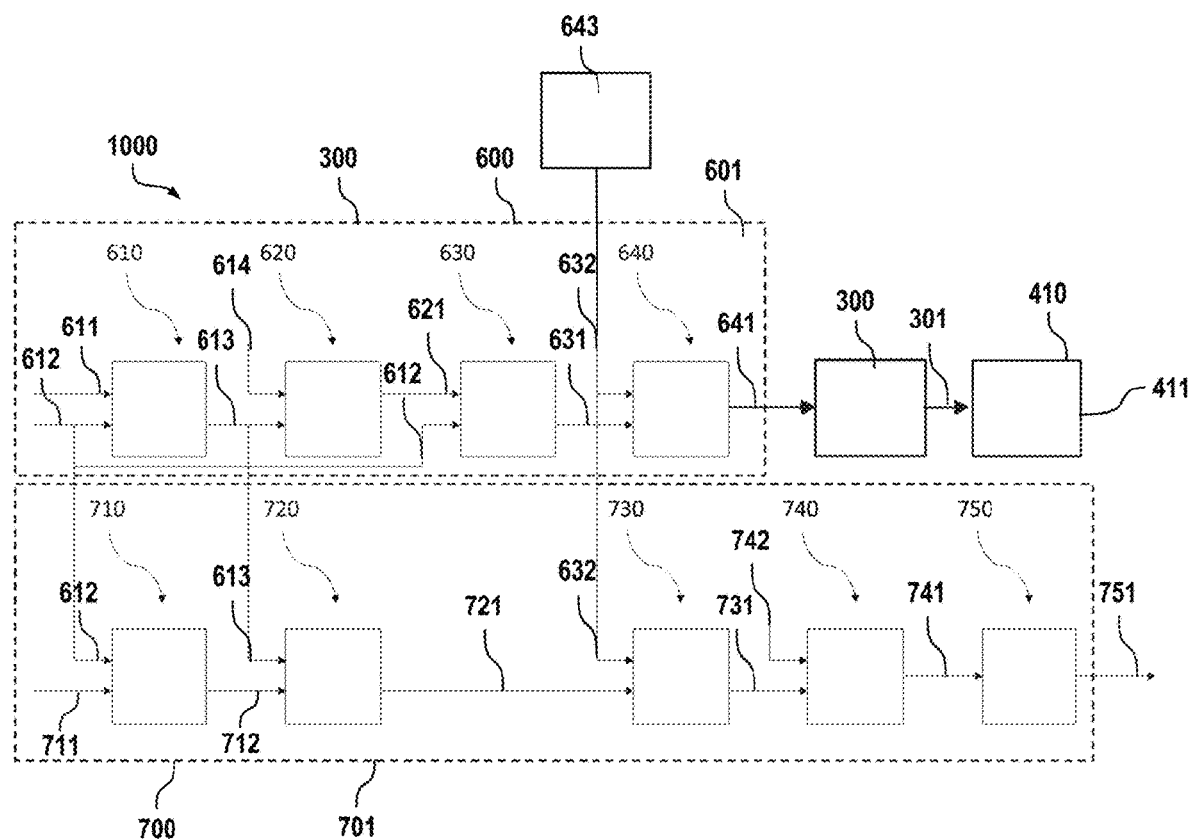
FIG. 3 shows a schematic block diagram of a control circuit refinement of an exemplary power train and/or grid system.

According to FIG. 3, a schematic block diagram of a control circuit refinement of an exemplary power train and/or grid system 1000 is shown. The control circuit refinement may be implemented in the inverter controller 600 as a control algorithm 601. The inverter controller 600 may be implemented in the inverter unit 300 or may be configured as a separated, preferably spaced apart and/or stand-alone unit. The at least one phase load 410, such as an electric motor 411, may be controlled by means of an input voltage 301 that is provided by the inverter unit 300. For motor control, the control algorithm 601 may use a field-oriented control approach. The control algorithm 601 may be configured as a control loop for controlling a respective motor current for each phase of the preferably three-phase load 410 of individual phases regarding at least one reference and/or demanded value. Therefore, phase current measurement values 611 of the at least one phase load 410 may be provided by measuring the phase current measurement values of the at least one phase load 410, as indicated in block 412.

The control algorithm 601 may be configured to transform the preferably measured and/or provided phase current measurement values 611 from an a-b-c reference frame into a d-q reference frame by performing d-q-transform operation. The d-q operation is indicated by control block 610. For performing the d-q-transform operation 610, preferably at least one position signal 612 may be measured by the position sensor 422 and/or provided by the already above-indicated position identification algorithm. As an outcome of the d-q-transform operation, two d-q-transform values 613 of the phase current measurement values 611 of the at least one phase load 410, particularly preferable the electric motor 411, are provided. The d-q-transform values 613 are provided as d-q-transform current values. The control algorithm 601 may further be configured to regulate the provided d-q-transform values 613 based on at least one current flow demand value 614 of at least one phase load 410. The regulation operation is indicated by control block 620. The at least one current flow demand value 614 may be an accelerator pedal request value of an electric vehicle. As an output of the regulation operation 620, the control algorithm 601 may be provided and/or calculate respective required output voltage values 621 in the d-q reference frame. The control algorithm 601 may be configured to transform back the d-q output voltage values 621 to the a-b-c reference frame by a back-transform operation, indicated by block 630. The back-transform operation 630 may be performed based on the at least one position signal 612 that is preferably provided as an input for the back-transform operation 630. The a-b-c output voltage values are indicated by reference sign 631. The a-b-c output voltage values 631 may be further modulated based on at least one output voltage measurement value 632 of the second energy storage system 110 in a modulation operation, indicated by control block 640. Of course, in alternative embodiments, such a modulation may be performed based on other current, voltage, power of the like based values. Such values may be variable values or fixed values. As an output of the modulation operation 640, switching signals 641 for the inverter unit 300 may be provided. Based on these switching signals 641, the inverter unit 300 is controlled for thereby controlling the electric motor 411. The output voltage measurement value 632 of the second energy storage system 110 may be monitored by an energy storage management system 643 of the second energy storage system 110.

Battery controller 700 is preferably configured to perform control of the first energy storage system 510. By controlling the output of the first energy storage system 510, the second energy storage system 110 is indirectly controlled. Therefore, by the battery controller 700, a control of an individual contribution of the first and the second energy storage system 510, 110 is performed. Therefore, the battery controller 700 may comprise at least one battery control algorithm 701 that may comprise at least one control loop for actively controlling the output voltage 511 of the first energy storage system 510 for controlling a reactive or active power flow from or into either of the energy storage systems 510, 110. In an embodiment of the battery control algorithm 701, the battery control algorithm 701 may be configured to perform a d-q transform operation 710 for transforming provided and/or measured phase voltage measurement values 711 into respective d-q-transform values 712. The two d-q-transform values 712 are provided as d-q-transform voltage values. The d-q transform operation 710 is preferably performed based on the at least one position signal 612 that may therefore be provided as an input for the d-q transform operation 710. The transformed d-q-transform values 712 of the phase voltage measurement values 711 may be used together with the, particularly from the regulation operation 620, provided d-q-transform values 613 of the phase current measurement values 611 to calculate a reactive or active power flow demand value 721. In other words, the battery control algorithm 701 may be configured, by performing a calculation operation 720, for calculating the at least one reactive or active power flow demand value 721 based on two d-q-transform values 712 of phase voltage measurement values 711 and two d-q-transform values 613 of phase current measurement values 611 of the at least one phase load and/or the phase grid 410. The battery control algorithm 701 may be configured to perform a division operation 730 by dividing the reactive or active power flow demand value 721 by the provided output voltage measurement value 632 of the second energy storage unit 110. As an output of the division operation 730, a reactive or active-power-flow-demand current value 731 of the second energy storage system 110 is provided. By a further calculation operation 740, the battery control algorithm 701 may be configured to calculate a control output voltage value 741 of the first energy storage system 510 based on the active-power-flow-demand current value 731 and a current measurement value 742 of the second energy storage system 110. The battery control algorithm 701 may be configured to modulate, in a modulation operation 750, the control output voltage value 741 into at least one control signal 751. Based on these control signals 751, the output voltage 511 of the first energy storage system 510 can be controlled. The control signals 751 may be provided as switching signals. It shall be understood that block 710 and 720 may be substituted by any algorithm configured for calculating the at least one reactive or active power flow demand value 721. The current measurement value 742 of the second energy storage system 110 may be monitored by the energy storage management system 643 of the second energy storage system 110.

Figure 4:
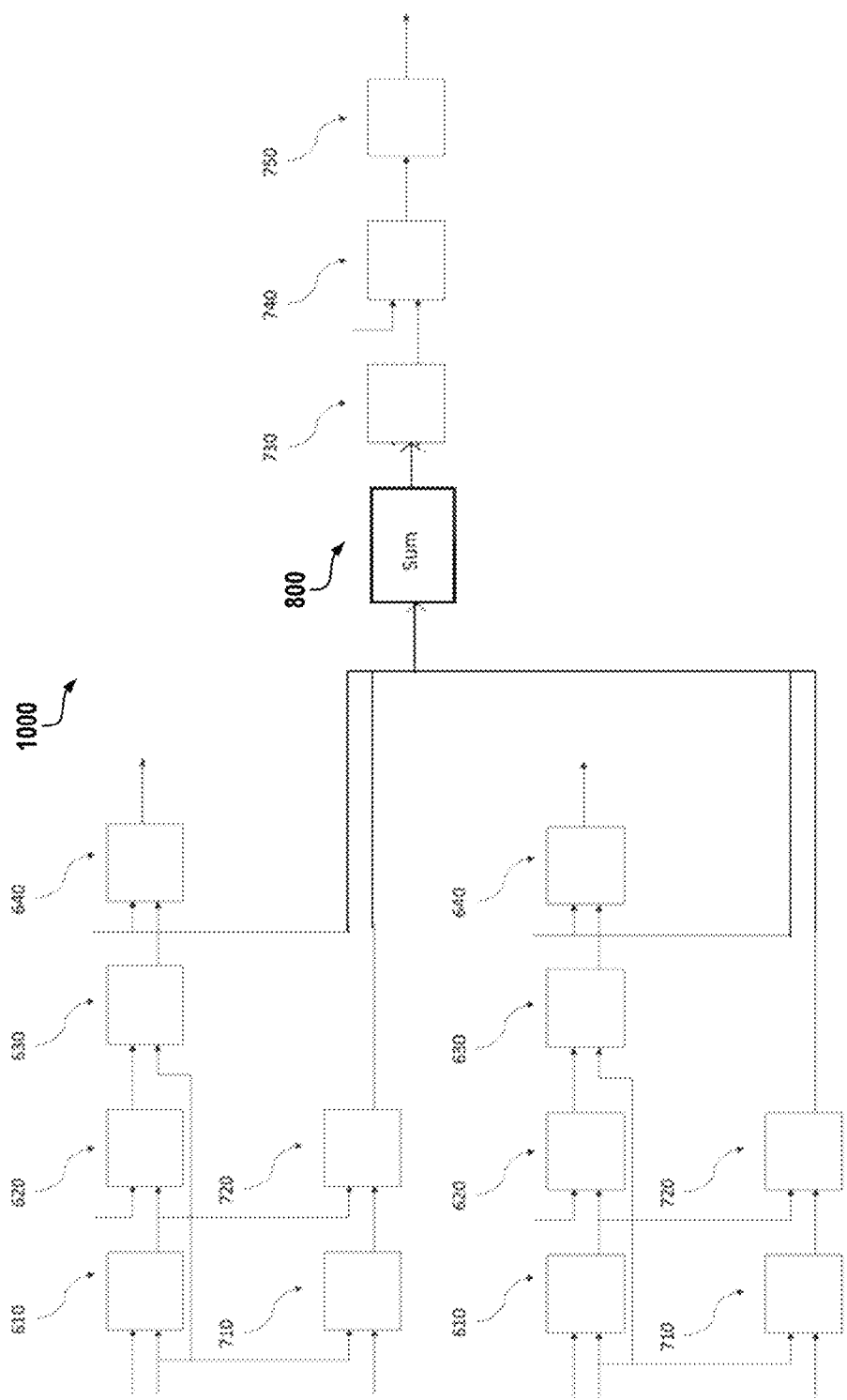
FIG. 4 shows a further schematic block diagram of a control circuit refinement of an exemplary power train and/or grid system.

According to FIG. 4, a schematic block diagram of a control circuit refinement of an exemplary power train and/or grid system 1000 is shown. In this control circuit refinement, the power train and/or grid system 1000 may be provided with more than one phase load 410. Particularly, the power train and/or grid system 1000 may comprise more than one electric motor 411 and corresponding inverters 300. In such a configuration, the control circuits for controlling the energy storage systems 110, 510 may be combined. A plurality of reactive or active power flow demand values 721 of a plurality of phase loads and/or the phase grid 410 are provided. The battery control algorithm 701 may be configured to sum up these reactive or active power flow demand values 721 in a summing operation 800 that is provided before the operations 730, 740, 750 are performed. FIG. 4 is extended by the summing operation 800. However, the residual figure description provided for FIG. 3 is applicable for FIG. 4 as well and may thus not be repeated at this point.

It may be noted that, to mitigate reactive power flow in the second energy storage system 110, the output voltage of the first energy storage system 510 can be actively controlled. In this way, the reactive power flow can be soaked by the first energy storage system 510. In principle, the second energy storage system 110 may be used to cover the active power of the phase load(s) 410, whereas the reactive power is covered at least partly by the first energy storage system 510. In some configurations, the reactive power may also be at least partly covered by the DC link capacitor 200. Therefore, the battery control algorithm 701 may be configured to set the output voltage 511 of the first energy storage system 510 to actively control the active power flow from the second energy storage system 110, whereas the reactive power may be "naturally" exchanged from the other sources of the DC link. Alternatively, the current demand (discharge rate) may be controlled externally rather than using instantaneous power. In this way, the second energy storage system 110 may stay protected from recuperative power flows from braking or any other source of reactive power, such as field weakening etc. Thereby, load conditions and/or lifetime may be improved.

Figure 5:
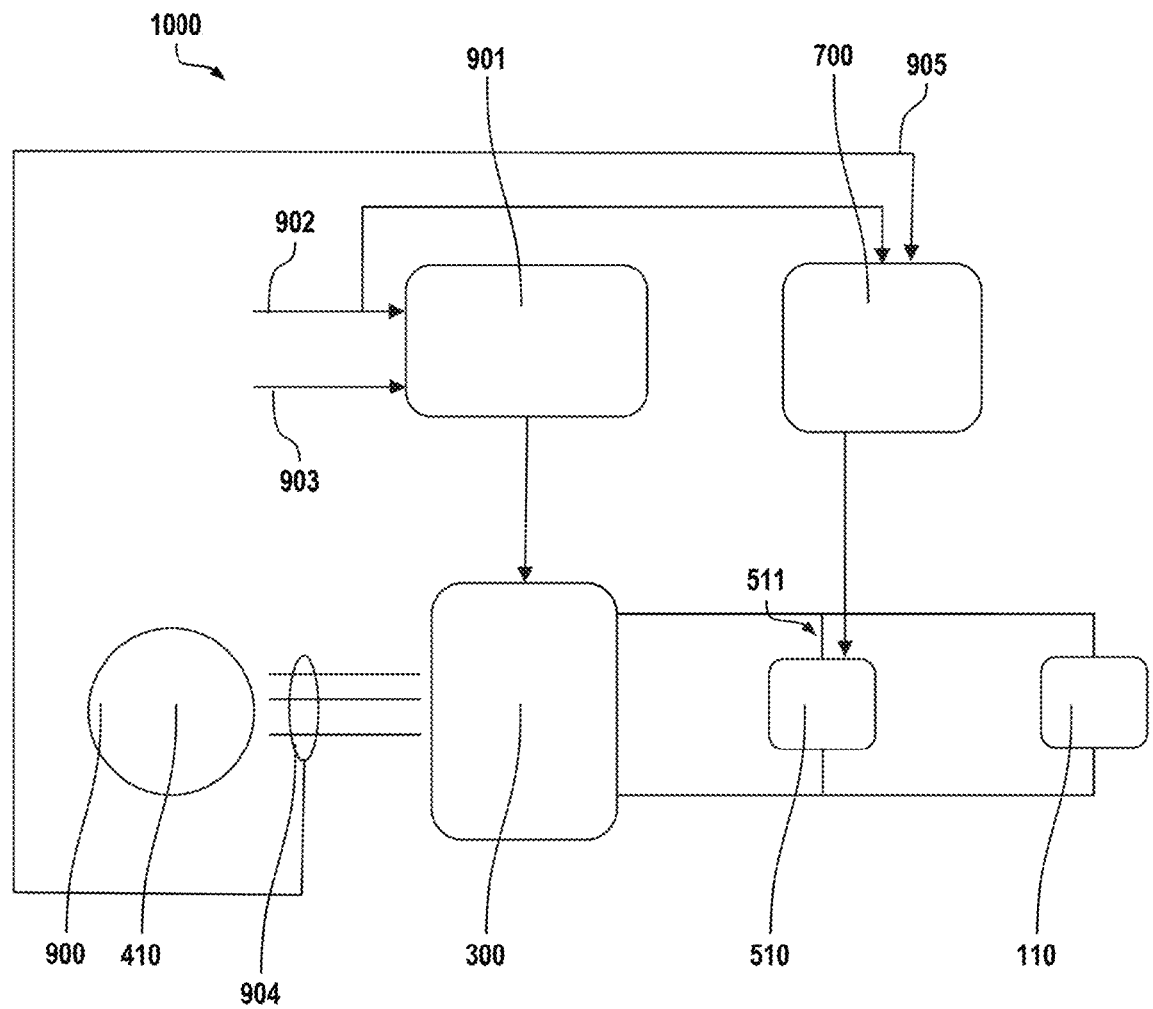
FIG. 5 shows an exemplary refinement of a presented power train and/or grid system.

FIG. 5 shows an exemplary refinement of a presented power train and/or grid system 1000 in a grid connection configuration. The three-phase grid 410, 900 is at least temporarily connectable to the inverter unit 300 for performing a charging operation of the first and/or the second energy storage system 510, 110 and/or for performing a grid support operation. The system 1000 comprises a power controller 901 configured to control the inverter unit 300 based on an active power flow demand 902 and a reactive power flow demand 903. The system 1000 further comprises a power measurement sensor 904 for measuring the at least one active power flow value 905 on the three-phase grid 410, 900. The battery controller 700 is configured to control the output voltage 511 of the first energy storage system 510 based on the active power flow demand 902 of the three-phase grid 410, 900 and/or based on a measured active power flow value 905 of the three-phase grid 410, 900.

Figure 6:
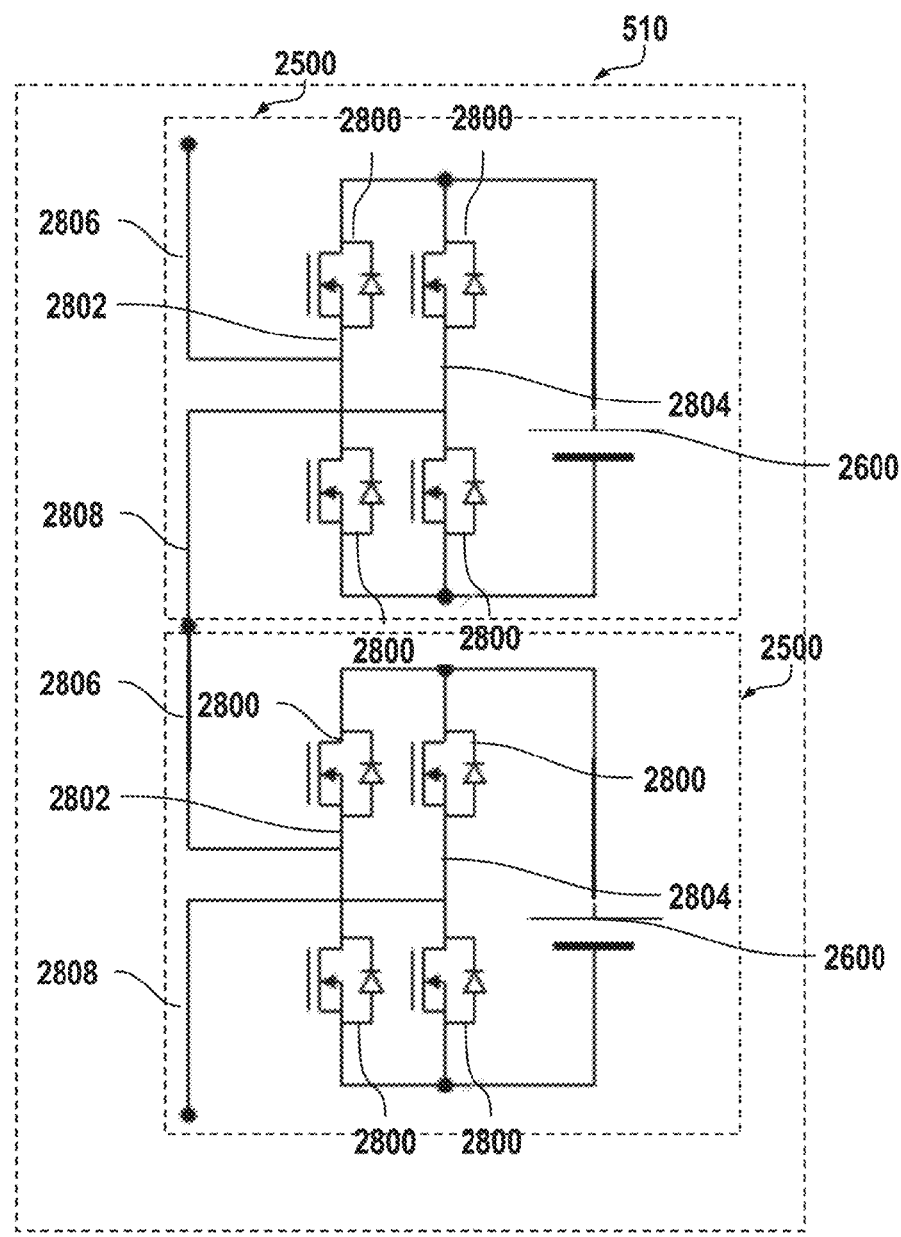
FIG. 6 shows a schematic refinement of a first energy storage system.

FIG. 6 shows a schematic refinement of the first energy storage system 510. It is to be specifically mentioned that this is only one possible configuration. There are multiple other topologies of a first energy storage system 510 that can be used. Particularly, FIG. 6 shows a potential switching setup for the first energy storage system 510. The first energy storage system 510 exemplarily comprises at least two switching devices 2500 each of which forming a module. Also, the first energy storage system 510 further comprising at least two energy sources 2600, wherein at least one of the energy sources 2600 is comprised in each of the switching devices 2500. Each of the at least two energy sources 2600 comprises at least one battery cell and/or at least one capacitor and/or at least one photovoltaic panel. The switching device 2500 being configured to selectively switch the at least one energy source 2600 of the respective module with respect to the other energy source 2600 at least temporarily in series positive or in series negative or in parallel to generate a controllable alternating or direct current at the output of the first energy storage system 510. The switching device 2500 exemplarily includes four switching elements 2800. In other topologies, a different number of switching elements 2800 may be used. Two respective switching elements 2800 are provided per module string 2802, 2804 of the exemplary first energy storage system 510. Between each of the two switching elements 2800 per string 2802, 2804 a respective further terminal connection 2806, 2808 is provided. The terminal connections 2806, 2808 may be used to modularly connect multiple switching devices 2500 and/or respective modules and/or respective first energy storage systems 510 together.

In alternative refinements, the first energy storage system 510 may comprise a battery and a DC/DC-converter, the DC/DC-converter being configured to at least temporarily connect and/or disconnect the first energy storage system 510 in parallel to the second energy storage system 110. The DC/DC-converter acts in this refinement as a switching device.

Figure 7:
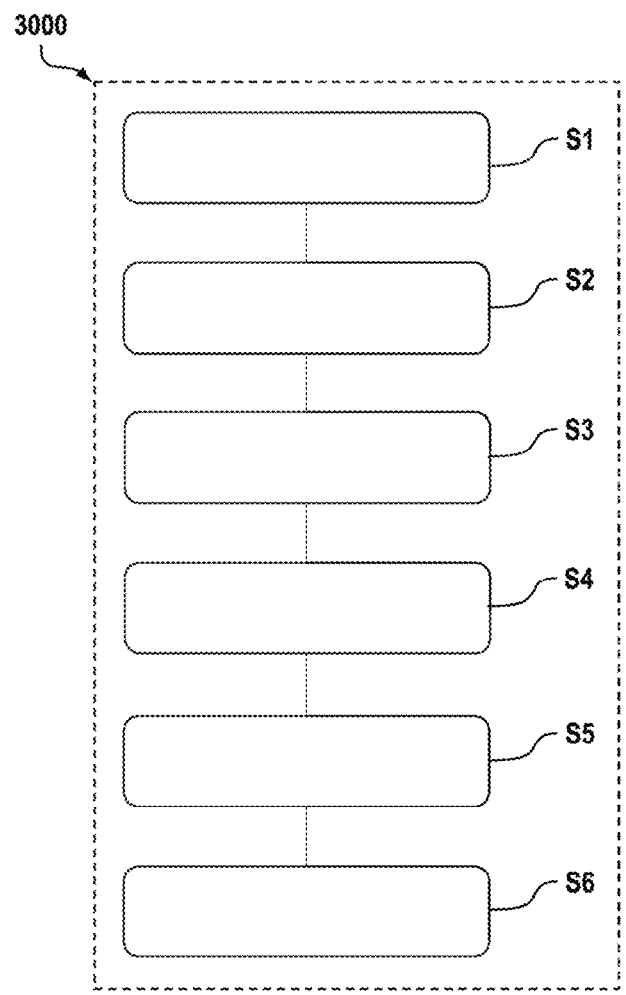
FIG. 7 shows a schematic flow chart of a refinement of the presented method.

FIG. 7 shows a schematic flow chart of a refinement of the presented method. Step S1 comprises providing at least one reactive or active power flow demand value 721 of at least one phase load and/or a phase grid 410. Step S2 comprises providing an output voltage measurement value 632 and a current measurement value 742 of the second energy storage system 110. Step S3 comprises calculating a reactive or active-power-flow-demand current value 731 of the second energy storage system 110 based on the at least one reactive or active power flow demand value 721 and the output voltage measurement value 632. Step S4 comprises calculating a control output voltage value 741 of the first energy storage system 510 based on the reactive or active-power-flow-demand current value 731 and the current measurement value 742 of the second energy storage system 110. Step S5 comprises modulating the control output voltage value 741 into at least one control signal 751. Step S6 comprises controlling the output voltage 511 of the first energy storage system 510 based on the at least one control signal 751. The method may be carried out at least partly by a data processing device 3000 comprising means for carrying out the method.

LIST OF REFERENCE SIGNS

- 110 second energy storage system
- 120 energy storage system voltage and energy storage system current sensor
- 130 filter unit
- 300 inverter unit
- 301 input voltage
- 410 phase load and/or the phase grid
- 411 electric motor
- 421 current measurement sensor
- 422 position sensor
- 510 first energy storage system
- 511 output voltage
- 520 filter unit
- 600 inverter controller
- 601 control algorithm
- 610 d-q-transform operation
- 611 phase current measurement values
- 612 position signal
- 613 d-q-transform values
- 614 current flow demand value
- 620 regulation operation
- 621 d-q output voltage values
- 630 back-transform operation
- 631 a-b-c output voltage values
- 632 output voltage measurement value
- 640 modulation operation
- 641 switching signals
- 643 energy storage management system
- 700 battery controller
- 701 battery control algorithm
- 710 d-q transform operation
- 711 phase voltage measurement values
- 712 d-q-transform values
- 720 calculation operation
- 721 reactive or active power flow demand value
- 730 division operation
- 731 reactive or active-power-flow-demand current value
- 740 calculation operation
- 741 control output voltage value
- 742 current measurement value
- 750 modulation operation
- 751 control signal
- 900 three-phase grid
- 901 power controller
- 902 active power flow demand
- 903 reactive power flow demand
- 904 power measurement sensor
- 905 active power flow value
- 1000 power train and/or grid system
- 1500 powertrain
- 2000 electric vehicle
- 2500 switching device
- 2600 energy sources
- 2800 switching elements
- 2802 module string
- 2804 module string
- 2806 terminal connection
- 2808 terminal connection
- 3000 data processing device

The invention claimed is:

1. A method for actively controlling an output voltage of a first energy storage system connected in parallel to a second energy storage system for controlling a reactive or active power flow from or into either of the energy storage systems, the method comprising:

providing at least one reactive or active power flow demand value of at least one phase load and/or a phase grid;

providing an output voltage measurement value and a current measurement value of the second energy storage system;

calculating a reactive or active-power-flow-demand current value of the second energy storage system based on the at least one reactive or active power flow demand value and the output voltage measurement value;

calculating a control output voltage value of the first energy storage system based on the reactive or active-power-flow-demand current value and the current measurement value of the second energy storage system;

modulating the control output voltage value into at least one control signal; and controlling the output voltage of the first energy storage system based on the at least one control signal.

2. The method of claim 1, wherein providing the at least one reactive or active power flow demand value comprises at least one of the following:

calculating the at least one reactive or active power flow demand value based on a phase voltage measurement value and a phase current measurement value using a power-calculation-algorithm;

calculating the at least one reactive or active power flow demand value based on two d-q-transform values of phase voltage measurement values and two d-q-transform values of phase current measurement values of the at least one phase load and/or the phase grid;

calculating and/or receiving the at least one reactive or active power flow demand value based on an accelerator input value provided by an accelerator of a vehicle; and/or calculating and/or receiving the at least one reactive or active power flow demand value of the phase grid based on an active power flow demand and/or a reactive power flow demand of the phase grid; and measuring the at least one reactive or active power flow demand value on the phase grid and/or the at least one phase load.

3. The method of claim 2, wherein calculating the at least one reactive or active power flow demand value based on the two d-q-transform values of the phase voltage measurement values and the two d-q-transform value of the phase current measurement values of the at least one phase load and/or the phase grid comprises:

providing at least one position signal and/or phase signal of the at least one phase load and/or phase grid;

providing the phase voltage measurement values of the at least one phase load and/or the phase grid;

transforming the phase voltage measurement values into a d-q-system to provide the two d-q-transform values of the phase voltage measurement values of the at least one phase load and/or the phase grid; and providing the two d-q-transform values of the phase current measurement values of the at least one phase load and/or the phase grid by a control circuit of the at least one phase load and/or the phase grid.

4. The method of claim 3, wherein providing the two d-q-transform values of the phase current measurement values of the at least one phase load and/or the phase grid by the control circuit of the at least one phase load and/or the phase grid comprises the following steps performed by the control circuit:

providing the at least one position signal and/or phase signal of the at least one phase load and/or phase grid by measuring the at least one position signal and/or phase signal with a position sensor and/or a position identification algorithm;

providing the phase current measurement values of the at least one phase load and/or the phase grid by measuring the phase current measurement values of the at least one phase load and/or the phase grid; and transforming the phase current measurement values into the d-q-system to provide the two d-q-transform values of the phase current measurement values of the at least one phase load and/or the phase grid.

5. The method of claim 1, wherein providing the output voltage measurement value and the current measurement value of the second energy storage system comprises:

monitoring the output voltage measurement value and the current measurement value of the second energy storage system by an energy storage management system of the second energy storage system.

6. The method of claim 1, wherein controlling of the output voltage of the first energy storage system issues an actively controlling of the reactive or active power flow from or into the second energy storage system.

7. The method of claim 1, wherein providing the at least one reactive or active power flow demand value comprises:

providing a plurality of reactive or active power flow demand values of a plurality of phase loads and/or the phase grid; and summing the plurality of reactive or active power flow demand values of the plurality of phase loads and/or the phase grid.

8. A power train and/or grid system, comprising:

a second energy storage system;

a first energy storage system connected in parallel to the second energy storage system;

an inverter unit connected in parallel to the first energy storage system and the second energy storage system; and a battery controller configured to actively control an output voltage of the first energy storage system for controlling a reactive or active power flow from or into either of the energy storage systems;

wherein the battery controller is at least configured to perform steps, comprising:

providing at least one reactive or active power flow demand value of at least one phase load and/or a phase grid;

providing an output voltage measurement value and a current measurement value of the second energy storage system;

calculating a reactive or active-power-flow-demand current value of the second energy storage system based on the at least one reactive or active power flow demand value and the output voltage measurement value;

calculating a control output voltage value of the first energy storage system based on the active-power-flow-demand current value and the current measurement value of the second energy storage system;

modulating the control output voltage value into at least one control signal; and controlling the output voltage of the first energy storage system based on the at least one control signal.

9. The power train and/or grid system of claim 8, wherein the first energy storage system is configured to receive the reactive power flow at least partly to mitigating said reactive power flow to the second energy storage system.

10. The power train and/or grid system of claim 8, further comprising:
a current measurement sensor for measuring phase current measurement values of the at least one phase load and/or the phase grid;
an energy storage system voltage and energy storage system current sensor for measuring the output voltage measurement value and the current measurement value of the second energy storage system;
at least one position sensor and/or a position identification algorithm for measuring at least one position signal and/or phase signal; and
an inverter controller configured to control the inverter unit based on the phase current measurement values, the position signal and/or phase signal, the output voltage measurement value and the current measurement value of the second energy storage system;
wherein the at least one phase load and/or the phase grid is connected to the inverter unit.

11. The power train and/or grid system of claim 8, further comprising:
a capacitor connected in parallel to the first energy storage system;
wherein the capacitor is configured to receive the reactive power flow at least partly to mitigating said reactive power flow to the second energy storage system.

12. The power train and/or grid system of any one of claims 8 to 11, further comprising:
at least a first filter unit connected to the first energy storage system; and/or
at least a second filter unit connected to the second energy storage system.

13. The power train and/or grid system of claim 9, wherein one or more of the following:
the phase grid is at least temporarily connectable to the inverter unit for performing a charging operation of the first and/or the second energy storage system and/or for performing a grid support operation;
wherein the power train and/or grid system further comprises a power controller configured to control the inverter unit based on an active power flow demand and a reactive power flow demand;
wherein the power train and/or grid system further comprises a power measurement sensor for measuring the at least one active power flow value on the phase grid; and
wherein the battery controller configured to control the output voltage of the first energy storage system based on the active power flow demand of the phase grid and/or based on a measured active power flow value of the phase grid.

14. The power train and/or grid system of claim 8, wherein the first energy storage system comprises at least one switching device;
wherein the first energy storage system further comprising at least two energy sources, the switching device being configured to selectively switch the at least two energy sources with respect to one another at least temporarily in series positive or in series negative or in parallel to generate a controllable alternating or direct current at the output of the first energy storage system, or
wherein the first energy storage system comprising a battery and a DC/DC-converter, the DC/DC-converter being configured to at least temporarily connect and/or disconnect the first energy storage system in parallel to the second energy storage system.

15. The power train and/or grid system of claim 14, wherein the second energy storage system comprises a battery; and/or wherein the second energy storage system comprises a single energy storage unit or a plurality of energy storage units.

16. The power train and/or grid system of claim 14, wherein each of the at least two energy sources comprises at least one battery cell and/or at least one capacitor and/or at least one photovoltaic panel and/or at least one fuel cell and/or at least one alternative source of electrical energy.

17. The power train and/or grid system of claim 8, wherein the first energy storage system comprises a high-power density in comparison to the second energy storage system; and wherein the second energy storage system comprises a high-energy density in comparison to the first energy storage system, or
wherein the first energy storage system comprises a high-energy density in comparison to the second energy storage system; and wherein the second energy storage system comprises a high-power density in comparison to the first energy storage system.

18. A data processing device, comprising:
a processor and a memory storing instructions, which when executed by the processor, is configured to perform the method of claim 1.

19. An electric vehicle, comprising:
the power train and/or grid system of claim 8.

* * * * *